(12) United States Patent
Matsumoto

(10) Patent No.: US 12,545,778 B2
(45) Date of Patent: Feb. 10, 2026

(54) RESIN PARTICLE AND PRODUCTION METHOD THEREFOR, AND HYDROPHILICITY IMPARTING AGENT CONTAINING SAID RESIN PARTICLE

(71) Applicant: NIPPON SHOKUBAI CO., LTD., Osaka (JP)

(72) Inventor: Kazuaki Matsumoto, Osaka (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 908 days.

(21) Appl. No.: 17/598,436

(22) PCT Filed: Feb. 27, 2020

(86) PCT No.: PCT/JP2020/008113
§ 371 (c)(1),
(2) Date: Sep. 27, 2021

(87) PCT Pub. No.: WO2020/202938
PCT Pub. Date: Oct. 8, 2020

(65) Prior Publication Data
US 2022/0162434 A1    May 26, 2022

(30) Foreign Application Priority Data
Mar. 29, 2019  (JP) .................. 2019-067834

(51) Int. Cl.
| C08L 25/10 | (2006.01) |
| C08F 20/06 | (2006.01) |
| C08F 210/12 | (2006.01) |
| C08F 212/36 | (2006.01) |
| C08L 25/14 | (2006.01) |

(52) U.S. Cl.
CPC .............. *C08L 25/10* (2013.01); *C08F 20/06* (2013.01); *C08F 210/12* (2013.01); *C08F 212/36* (2013.01); *C08L 25/14* (2013.01)

(58) Field of Classification Search
CPC .......... C08L 25/10; C08L 25/14; C08F 20/06; C08F 210/12; C08F 212/36
See application file for complete search history.

(56) References Cited

U.S. PATENT DOCUMENTS

| 3,427,262 A | 2/1969 | Corte et al. |
| 4,272,422 A | 6/1981 | Tanaka |
| 5,681,889 A | 10/1997 | Kondo et al. |
| 6,335,060 B1 | 1/2002 | Inoue |
| 2015/0147550 A1* | 5/2015 | Kitayama .............. C08L 33/06 525/85 |

FOREIGN PATENT DOCUMENTS

| EP | 1 057 840 | 12/2000 |
| JP | 55-27346 | 2/1980 |
| JP | 4-132705 | 5/1992 |
| JP | 8-3251 | 1/1996 |
| JP | 2007-46044 | 2/2007 |
| JP | 2007-254727 | 10/2007 |
| JP | 2008-163187 | 7/2008 |
| JP | 2017-56404 | 3/2017 |

OTHER PUBLICATIONS

English translation of JP-2007254727 (Year: 2007).*
International Search Report issued Apr. 7, 2020 in International (PCT) Application No. PCT/JP2020/008113.
Office Action issued Jan. 17, 2024 in corresponding Korean Patent Application No. 10-2021-7031068, with English machine translation.
Office Action issued Apr. 8, 2024 in corresponding European Patent Application No. 20 783 607.3.
Extended European Search Report issued Nov. 21, 2022, in corresponding European Patent Application No. 20783607.3, 8 pages.
Smith et al., "Crosslinking kinetics of methyl and ethyl (α-hydroxymethyl) acrylates: effect of crosslinker type and functionality", Polymer, 2003, vol. 44, pp. 6211-6216, 6 pages.
Office Action issued Oct. 21, 2023 in corresponding Chinese Patent Application No. 202080024714.X, with English language translation.
Communication pursuant to Article 94(3) EPC issued Nov. 6, 2025 in corresponding European Patent Application No. 20783607.3, 7 pages.
Margel et al., "Methyl a-(Hydroxymethyl)acrylate Microspheres: Design, Synthesis, Characterization, and Use", Journal of Colloid and Interface Science, Academic Press, Inc., vol. 150, No. 1, Apr. 1992, pp. 22-35, XP024208671.

* cited by examiner

*Primary Examiner* — Catherine S Branch
*Assistant Examiner* — Andrea Wu
(74) *Attorney, Agent, or Firm* — Wenderoth, Lind & Ponack, L.L.P.

(57) ABSTRACT

It is provided that a particulate hydrophilic resin that can be produced under mild conditions, and that has a small load on the environment. A resin particle comprising a crosslinked structure in which at least one of monomers represented by the following general formula (1) and a polyfunctional ethylenically unsaturated monomer are crosslinked,

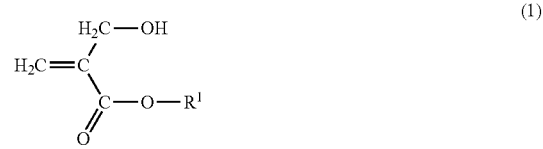

(1)

wherein $R^1$ represents an alkyl group having 1 to 4 carbon atoms, a hydrogen atom, an alkali metal atom, or an ammonium.

13 Claims, No Drawings

RESIN PARTICLE AND PRODUCTION METHOD THEREFOR, AND HYDROPHILICITY IMPARTING AGENT CONTAINING SAID RESIN PARTICLE

TECHNICAL FIELD

The present invention relates to a resin particle and a production method therefor, and a hydrophilicity imparting agent containing the resin particle.

BACKGROUND ART

Conventionally, it is known that, by adding crosslinkable hydrophilic particles to a resin composition or a coating agent, hydrophilicity can be imparted to a film formed by using the resin composition or a coating film formed by using the coating agent, and the surface structure of the film or the coating film can be controlled.

Examples of the method for producing the crosslinkable hydrophilic particles include a method of polymerizing a hydrophilic monomer in a solvent-based solvent and a method of polymerizing a hydrophobic monomer in an aqueous solvent and then hydrolyzing the obtained polymer. As a method of polymerizing a hydrophilic monomer in a solvent-based solvent, for example, Patent Literature 1 discloses a method for producing hydrophilic fine particles by polymerizing acrylamide and derivatives thereof in a solvent containing a water-miscible organic solvent such as alcohol, and Patent Literature 2 discloses hydrophilic crosslinked polymer fine particles produced by adding a predetermined hydrophilic monomer, a (meth)acrylamide-based monomer, a crosslinkable unsaturated monomer, or the like to an organic solvent. In addition, as a method of polymerizing a hydrophobic monomer in an aqueous solvent and then hydrolyzing the obtained polymer, for example, Patent Literatures 3 and 4 each indicate that an aqueous dispersion is obtained by polymerizing acrylonitrile and a crosslinkable monomer in an aqueous medium and adding an alkali metal hydroxide such as sodium hydroxide to the obtained particles to hydrolyze the particles.

CITATION LIST

Patent Literature

[PTL 1] Japanese Laid-Open Patent Publication No. H4-132705
[PTL 2] Japanese Laid-Open Patent Publication No. H8-3251
[PTL 3] Japanese Laid-Open Patent Publication No. S55-27346
[PTL 4] Japanese Laid-Open Patent Publication No. 2017-56404

SUMMARY OF THE INVENTION

Problems to be Solved by the Invention

However, the resin particles polymerized in the solvent-based solvent as in Patent Literatures 1 and 2 described above have a problem that the resin particles are not environmentally friendly in that the solvent-based solvent is used. On the other hand, when a film or a coating film is formed by using a resin composition containing resin particles formed by using a monomer containing a nitrogen atom as in Patent Literatures 3 and 4 described above, there is a problem that the film or the coating film is colored. In addition, in Patent Literatures 3 and 4, in order to obtain hydrophilic resin particles or aqueous dispersion, it is necessary to carry out a hydrolysis reaction using an aqueous solution of sodium hydroxide (caustic soda) under severe conditions of 90 to 95° C.

Meanwhile, when a hydrophilic monomer is polymerized in an aqueous solvent, the load on the environment is small and the severe hydrolysis conditions are not required, but the polymer gels in the aqueous solvent, and a particulate polymer cannot be obtained.

Moreover, it is also conceivable to add crosslinked polyacrylic acid particles to a solvent to prepare an aqueous dispersion. However, since the crosslinked polyacrylic acid particles have high hydrophilicity and the aqueous dispersion has a high viscosity, when the particles or the aqueous dispersion is used as various additives, there is a problem that blending becomes difficult due to an increase in viscosity.

An object of the present invention is to provide a particulate hydrophilic resin that does not cause an excessive increase in viscosity, that can be produced under mild conditions, and that has a small load on the environment. Another object of the present invention is to provide a method for producing the particle that does not cause an excessive increase in viscosity even when used as various additives, and a hydrophilicity imparting agent containing the particle.

Solution to the Problems

As a result of thorough research for solving the above problems, the present inventor has found that, even when a resin particle including a crosslinked structure in which a specific hydroxymethylacrylic acid-based monomer, which is a hydrophilic monomer, and a polyfunctional ethylenically unsaturated monomer are crosslinked is polymerized in an aqueous solvent, the resin particle can be polymerized in the form of granules, and severe hydrolysis conditions are not required. A solvent-based solvent is not used for the resin particle obtained in this manner, and thus the resin particle is environmentally friendly.

That is, the present invention includes the following inventions.

[1] A resin particle comprising a crosslinked structure in which at least one of monomers represented by the following general formula (1) and a polyfunctional ethylenically unsaturated monomer are crosslinked,

[Chem. 1]

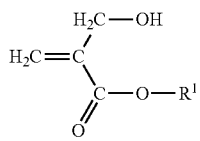

(1)

wherein $R^1$ represents an alkyl group having 1 to 4 carbon atoms, a hydrogen atom, an alkali metal atom, or an ammonium.

[2] The resin particle according to the above [1], wherein the polyfunctional ethylenically unsaturated monomer is a non-hydrolyzable monomer.

[3] The resin particle according to the above [1] or [2], wherein the polyfunctional ethylenically unsaturated monomer is a hydrocarbon-based crosslinking agent optionally having an ether bond, and has two or more ethylenically unsaturated bonds.

[4] The resin particle according to any one of the above [1] to [3], wherein the polyfunctional ethylenically unsaturated monomer is at least one of divinylbenzene and 1,3-butadiene.

[5] The resin particle according to any one of the above [1] to [4], wherein a monomer unit derived from the general formula (1) is 30 to 99.99% by mass in total.

[6] The resin particle according to any one of the above [1] to [5], wherein the resin particle has a moisture absorption ratio of not lower than 2.5% by mass.

[7] An aqueous dispersion containing water and the resin particle according to any one of the above [1] to [6] dispersed in the water.

[8] The aqueous dispersion according to the above [7], wherein the resin particle has a volume average particle diameter of 10 nm to 10 μm.

[9] A hydrophilicity imparting agent containing the resin particle according to any one of the above [1] to [6].

[10] A method for producing a resin particle, comprising emulsion polymerization in which at least one of monomers represented by formula (2) and a polyfunctional ethylenically unsaturated monomer are dispersed in an aqueous solvent in the presence of an emulsifier and a polymerization reaction is carried out,

[Chem. 2]

(2)

wherein $R^2$ represents an alkyl group having 1 to 4 carbon atoms.

Advantageous Effects of the Invention

When the monomers represented by the above general formula (1) (hydroxymethylacrylic acid-based monomers) are copolymerized with a crosslinkable monomer, granulation is enabled even if the polymerization is carried out in an aqueous solvent, so that hydrophilic resin particles can be produced without using a solvent-based solvent. In addition, when the hydroxymethylacrylic acid-based monomer is used, hydrophilic resin particles can be produced without performing hydrolysis under severe conditions.

Moreover, when the resin particle of the present invention is used, the viscosity of a particle dispersion is extremely low as compared with a polyacrylic acid crosslinked product having a similar skeleton, so that a blended composition can be easily obtained by adding the resin particle of the present invention to various resin compositions or a coating agent.

DESCRIPTION OF EMBODIMENTS

1. Resin Particle

The resin particle of the present invention includes a crosslinked structure in which at least one of monomers (hereinafter, referred to as hydroxymethylacrylic acid-based monomers) represented by the following general formula (1) and a polyfunctional ethylenically unsaturated monomer are crosslinked.

[Chem. 3]

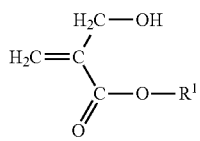

(1)

wherein $R^1$ represents an alkyl group having 1 to 4 carbon atoms, a hydrogen atom, an alkali metal atom, or an ammonium. The hydrogen atom, the alkali metal atom, and the ammonium may be introduced by hydrolyzing $R^1$ after a hydroxymethylacrylic acid-based monomer in which $R^1$ is an alkyl group having 1 to 4 carbon atoms is polymerized to form a resin particle.

The alkyl group having 1 to 4 carbon atoms represented by $R^1$ is preferably an alkyl group having 1 to 2 carbon atoms, and more preferably an alkyl group (methyl group) having 1 carbon atom. In addition, the resin particle of the present invention has a monomer unit (also referred to as a structural unit, and means a residue after a carbon double bond is involved in polymerization. The same applies hereinafter) derived from a hydroxymethylacrylic acid-based monomer, and the resin particle may be any of an unhydrolyzed product, a partially hydrolyzed product, a completely hydrolyzed product, and a hydrolyzed neutralized product. The unhydrolyzed product contains a monomer unit derived from a hydroxymethylacrylic acid-based monomer in which $R^1$ is an alkyl group having 1 to 4 carbon atoms, and substantially does not contain a monomer unit derived from a hydroxymethylacrylic acid-based monomer in which $R^1$ is a hydrogen atom, an alkali metal atom, or an ammonium. The partially hydrolyzed product or a neutralized product thereof contains both a monomer unit derived from a hydroxymethylacrylic acid-based monomer in which $R^1$ is an alkyl group having 1 to 4 carbon atoms and a monomer unit derived from a hydroxymethylacrylic acid-based monomer in which $R^1$ is a hydrogen atom, an alkali metal atom, or an ammonium. The completely hydrolyzed product or a neutralized product thereof substantially does not contain a monomer unit derived from a hydroxymethylacrylic acid-based monomer in which $R^1$ is an alkyl group having 1 to 4 carbon atoms, and contains a monomer unit derived from a hydroxymethylacrylic acid-based monomer in which $R^1$ is a hydrogen atom, an alkali metal atom, or an ammonium.

The content of the monomer unit (structural unit) derived from the hydroxymethylacrylic acid-based monomer in the resin particle is preferably not lower than 20% by mass, more preferably not lower than 30% by mass, further preferably not lower than 50% by mass, even further preferably not lower than 70% by mass, particularly preferably not lower than 80% by mass, and most preferably not lower than 90% by mass, and is preferably not higher than 99.99% by mass, more preferably not higher than 99.9% by mass, further preferably not higher than 99% by mass, particularly preferably not higher than 97% by mass, and most preferably not higher than 95% by mass. When the proportion of the monomer unit (structural unit) derived from the polyfunctional ethylenically unsaturated monomer is set to a predetermined content, a resin particle having high hydrophilicity can be obtained.

As the polyfunctional ethylenically unsaturated monomer, one type or two or more types can be used. The polyfunctional ethylenically unsaturated monomer is preferably a non-hydrolyzable monomer. In addition, as described later, hydrolysis can be carried out by adding a basic aqueous solution such as an aqueous sodium hydroxide solution, an aqueous ammonia solution, and an aqueous cyclohexylamine solution to the resin particle of the present invention contained in an aqueous dispersion, and thus the non-hydrolyzable monomer more preferably has base hydrolysis resistance. The non-hydrolyzable monomer is preferably a polyfunctional monomer (hydrocarbon) composed of only carbon atoms and hydrogen atoms, and may have an ether bond as necessary. In the present description, the polyfunctional monomer as a hydrocarbon which may have an ether bond is referred to as a hydrocarbon-based crosslinking agent optionally having an ether bond. The hydrocarbon-based crosslinking agent optionally having an ether bond preferably has two or more ethylenically unsaturated bonds and further preferably has two ethylenically unsaturated bonds. Specific examples of the hydrocarbon-based crosslinking agent optionally having an ether bond include divinylbenzene; 1,3-butadiene; trivinylbenzene; divinylnaphthalene; trivinylcyclohexane; divinyl ether; diallyl ethers; and polyvalent methacrylic acid esters. Examples of diallyl ethers include dialkylene glycol diallyl ethers such as diethylene glycol diallyl ether, dipropylene glycol diallyl ether, and dibutylene glycol diallyl ether; and polyalkylene glycol diallyl ethers such as polyethylene glycol diallyl ether, polypropylene glycol diallyl ether, and polybutylene glycol diallyl ether. Examples of polyvalent methacrylic acid esters include ethylene glycol dimethacrylate, diethylene glycol dimethacrylate, triethylene glycol dimethacrylate, tetraethylene glycol dimethacrylate, polyethylene glycol dimethacrylate, 1,3-butanediol dimethacrylate, 1,4-butanediol dimethacrylate, 1,6-hexanediol dimethacrylate, 1,9-nonanediol dimethacrylate, neopentyl glycol dimethacrylate, dipropylene glycol dimethacrylate, polypropylene glycol dimethacrylate, trimethylolpropane trimethacrylate, pentaerythritol trimethacrylate, pentaerythritol tetramethacrylate, dipentaerythritol hexamethacrylate, and methacrylic-modified polydimethylsiloxane.

The hydrocarbon-based crosslinking agent optionally having an ether bond preferably has two or more ethylenically unsaturated bonds and further preferably has two ethylenically unsaturated bonds. Specific examples of the hydrocarbon-based crosslinking agent optionally having an ether bond include divinylbenzene; 1,3-butadiene; trivinylbenzene; divinylnaphthalene; trivinylcyclohexane; divinyl ether; diallyl ethers; and polyvalent methacrylic acid esters. Among them, the hydrocarbon-based crosslinking agent optionally having an ether bond is more preferably at least one of divinylbenzene, 1,3-butadiene, diallyl ethers, and polyvalent methacrylic acid esters, further preferably at least one of divinylbenzene and 1,3-butadiene, and particularly preferably divinylbenzene.

The proportion of a bifunctional unsaturated monomer in the polyfunctional ethylenically unsaturated monomer is preferably not lower than 50% by mass, more preferably not lower than 70% by mass, further preferably not lower than 90% by mass, particularly preferably not lower than 95% by mass, and most preferably 100% by mass (the polyfunctional ethylenically unsaturated monomer consists only of the bifunctional unsaturated monomer).

The content of the monomer unit derived from the polyfunctional ethylenically unsaturated monomer in the resin particle is preferably not lower than 0.01% by mass, more preferably not lower than 0.1% by mass, further preferably not lower than 0.5% by mass, particularly preferably not lower than 2% by mass, and most preferably not lower than 5% by mass, and is preferably not higher than 70% by mass, more preferably not higher than 50% by mass, further preferably not higher than 30% by mass, particularly preferably not higher than 20% by mass, and most preferably not higher than 10% by mass. When the proportion of the monomer unit derived from the polyfunctional ethylenically unsaturated monomer is set to a predetermined content, a resin particle having high hydrophilicity can be obtained.

The resin particle may contain a monomer unit derived from a monomer other than the hydroxymethylacrylic acid-based monomers and the polyfunctional ethylenically unsaturated monomer, and the content of the monomer unit is preferably not higher than 75% by mass, more preferably not higher than 65% by mass, further preferably not higher than 50% by mass, preferably not higher than 30% by mass, more preferably not higher than 20% by mass, further preferably not higher than 10% by mass, particularly preferably not higher than 5% by mass, and most preferably not higher than 2% by mass.

Preferably, the resin particle does not contain a monomer unit derived from a monomer substantially containing a nitrogen atom in a covalent bond. When a film or the like is formed by using a resin composition containing a monomer containing a nitrogen atom, the film or the like may be colored. Specifically, the content of a nitrogen atom in the resin particle is not higher than 1% by mass, preferably not higher than 0.5% by mass, and more preferably not higher than 0.1% by mass.

The resin particle of the present invention may be a core-shell particle composed of a core portion and a shell portion provided on the surface of the core portion. When the resin particle of the present invention is formed to have a core-shell structure, the balance between the hydrophilicity of the surface of the resin particle and the moisture absorption (water absorption) of the entire resin particle can be easily adjusted. In the case of a core-shell particle, the shell portion may have the above-described configuration including a crosslinked structure in which at least one of the hydroxymethylacrylic acid-based monomers and a polyfunctional ethylenically unsaturated monomer is crosslinked. Meanwhile, the core portion preferably contains a monomer unit derived from a monofunctional (meth)acrylic monomer. As the monofunctional (meth)acrylic monomer, a $C_{1-12}$ alkyl ester of (meth)acrylic acid is preferable, and a $C_{1-4}$ alkyl ester of (meth)acrylic acid is more preferable. Examples of the monofunctional (meth)acrylic monomer include methyl (meth)acrylate, ethyl (meth)acrylate, propyl (meth)acrylate, n-butyl (meth)acrylate, isobutyl (meth)acrylate, and t-butyl (meth)acrylate, 2-ethylhexyl (meth)acrylate, and lauryl (meth)acrylate, and one or more of these monofunctional (meth)acrylic monomers can be used. The content of the monomer unit derived from the monofunctional (meth)acrylic monomer, in the core portion, is preferably not lower than 50% by mass, more preferably not lower than 70% by mass, further preferably not lower than 90% by mass, and particularly preferably 1.00% by mass. The core portion may or may not contain monomer units derived from a hydroxymethylacrylic acid-based monomer and a polyfunctional ethylenically unsaturated monomer.

A monomer other than the monofunctional (meth)acrylic monomer may be contained, and examples of the monomer other than the monofunctional (meth)acrylic monomer include monofunctional styrene-based monomers. Examples of styrene-based monomers include: styrene; styrene-based monofunctional monomers including alkyl styrenes such as o-methylstyrene, m-methylstyrene, p-methylstyrene, α-methylstyrene, ethyl vinyl benzene, and p-t-butylstyrene; and halogen group-containing styrenes such as o-chlorostyrene, m-chlorostyrene, and p-chlorostyrene. These monomers may be used individually, or two or more of these monomers may be used in combination.

The volume average particle diameter of the resin particle is preferably 10 nm to 10 µm, more preferably 50 nm to 5 µm, further preferably 100 nm to 1 µm, and particularly preferably 150 to 500 nm.

The moisture absorption ratio (water absorption ratio) at a temperature of 25° C. and a relative humidity of 60% of the resin particle is preferably not lower than 2.5% by mass, more preferably 3 to 25% by mass, and further preferably 5 to 15% by mass. The moisture absorption ratio is determined in more detail according to the procedure described in Examples.

2. Polymerization Method

The resin particle of the present invention is obtained by polymerizing a monomer in which R is an alkyl group having 1 to 4 carbon atoms (hereinafter, referred to as a hydroxymethylacrylic acid ester) out of the hydroxymethylacrylic acid-based monomers represented by formula (1) and a polyfunctional ethylenically unsaturated monomer (these may be collectively referred to as "raw material monomer component") in an aqueous solvent, and partially or completely hydrolyzing the obtained product as necessary. When the hydroxymethylacrylic acid ester is used as a hydrophilic monomer, even if polymerization is carried out in the aqueous solvent, the product can be made in the form of particles. In addition, since a crosslinked structure is introduced using the polyfunctional ethylenically unsaturated monomer, even if hydrolysis is carried out after the polymerization, the hydrolyzate can maintain the particle state. By the polymerization, an aqueous dispersion containing water and the resin particle dispersed in the water can be obtained. The aqueous dispersion will be described later.

Examples of the polymerization method include suspension polymerization, emulsion polymerization, and dispersion polymerization. Among them, emulsion polymerization in which the above raw material monomer component is dispersed in a reaction solvent and a (radical) polymerization reaction is carried out in the presence of an emulsifier, is preferable. Specifically, the method for producing the resin particle of the present invention preferably includes emulsion polymerization in which at least one of monomers represented by formula (2) and a polyfunctional ethylenically unsaturated monomer are dispersed in an aqueous solvent and a polymerization reaction is carried out in the presence of an emulsifier. In the method for producing the resin particle of the present invention by the above emulsion polymerization, the amount of the monomer component used for the emulsion polymerization is adjusted such that the resin particle is formed by the emulsion polymerization. In addition, in the case where the resin particle of the present invention is a core-shell particle composed of a core portion and a shell portion provided on the surface of the core portion, emulsion polymerization is carried out such that the shell portion includes a crosslinked structure in which at least one of the hydroxymethylacrylic acid-based monomers and a polyfunctional ethylenically unsaturated monomer are crosslinked. The emulsion polymerization may be carried out in only one step or in multiple steps.

[Chem. 4]

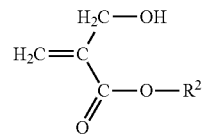

(2)

wherein $R^2$ represents an alkyl group having 1 to 4 carbon atoms.

As the emulsifier, one type or two or more types can be used, and the emulsifier may be a non-reactive surfactant or a reactive surfactant having a radically polymerizable group in the structure thereof.

Non-reactive surfactants include anionic and nonionic surfactants. Examples of the anionic surfactants include fatty acid salts, alkyl(allyl)sulfonates, alkyl sulfates, and polyoxyethylene alkyl(phenyl)ether sulfates, and examples of the nonionic surfactants include polyoxyethylene alkyl (phenyl)ethers, polyoxyethylene sorbitan fatty acid esters, polyoxyethylene fatty acid esters, and polyoxyethylene polyoxypropylene block polymers.

Reactive surfactants include anionic and nonionic surfactants. Examples of the anionic reactive surfactants include, but are not limited to, ether sulfate type reactive surfactants and phosphoric acid ester-based reactive surfactants.

Ether sulfate type reactive surfactants include a compound that has a polyoxyalkylene alkyl ether sulfate or a polyoxyalkylene phenyl ether sulfate as a basic skeleton and has a polymerizable alkenyl group (for example, an allyl group), a (meth)acryloyl group, or the like. Examples of ether sulfate type reactive surfactants include LATEMUL PD-1.04, PD-105 (manufactured by Kao Corporation), ELEMINOL RS-30, NHS-20 (manufactured by Sanyo Chemical Industries, Ltd.), AQUALON KH-5, KH-10, KH-20 (manufactured by DKS Co., Ltd.), ADEKA REASOAP SR-10, SR-20, and the like (manufactured by ADEKA CORPORATION).

Phosphoric acid ester-based reactive surfactants include a compound that has an alkyl phosphate, a polyoxyalkylene alkyl ether phosphoric acid (salt) or a polyoxyalkylene phenyl ether phosphoric acid (salt) as a basic skeleton and has a polymerizable alkenyl group (for example, an allyl group), a (meth)acryloyl group, or the like. Examples of phosphoric acid ester-based reactive surfactants include SIPOMER PZ-100 (manufactured by Solvay Nicca, Ltd.), H-3330PL, NEW FRONTIER S-510 (manufactured by DKS Co., Ltd.), Maxemul 6106, 6112 (manufactured by Croda international PLC), and ADEKA REASOAP PP-70 (manufactured by ADEKA CORPORATION).

Examples of other anionic reactive surfactants include SIPOMER COPS1 (manufactured by Solvay Nicca, Ltd.), ELEMINOL JS-20 (manufactured by Sanyo Chemical Industries, Ltd.), and Maxemul 5010, 5011 (manufactured by Croda International PLC).

Meanwhile, nonionic reactive surfactants include a compound that has a polyoxyalkylene alkyl ether as a basic skeleton and has a polymerizable alkenyl group (for example, an allyl group), a (meth)acryloyl group, or the like. Examples of nonionic reactive surfactants include ADEKA REASOAP NE-10, NE-20, NE-30, KR-10, ER-20, ER-30 (manufactured by ADEKA CORPORATION), LATEMUL PD-420, PD-430, PD-450 (manufactured by Kao Corporation), and AQUALON RN-10, RN-20, RN-30, RN-50 (manufactured by DKS Co., Ltd.).

As a surfactant for emulsion polymerization of the hydroxymethylacrylic acid ester, a reactive surfactant is preferably included, and an anionic reactive surfactant is more preferably included. Among them, an ether sulfate type reactive surfactant is further preferably included.

The amount of the emulsifier per 100 parts by mass of the total amount of the raw material monomer component is preferably not smaller than 0.05 parts by mass, more preferably not smaller than 0.1 parts by mass, and further preferably not smaller than 0.3 parts by mass, and is preferably not larger than 20 parts by mass, more preferably not larger than 10 parts by mass, further preferably not larger than 5 parts by mass, and particularly preferably not larger than 3 parts by mass.

Examples of the aqueous solvent include water alone or a mixed solvent of water and a water-miscible organic solvent, but the aqueous solvent is preferably water alone. The aqueous solvent typically refers to a solvent having a water content higher than 50% by volume. As the water, ion-exchanged water (deionized water), distilled water, pure water, or the like can be used. As the water-miscible organic solvent, an organic solvent (lower alcohol or the like) that can be uniformly mixed with water can be used. From the viewpoint of preventing the organic solvent from remaining in the resin particle as much as possible, an aqueous solvent in which 80% by volume or higher of the aqueous solvent is water is preferable, an aqueous solvent in which 90% by volume or higher of the aqueous solvent is water is more preferable, an aqueous solvent in which 95% by volume or higher of the aqueous solvent is water is further preferable, an aqueous solvent substantially composed of water (aqueous solvent in which 99.5% by volume or higher is water) is particularly preferable, and water alone is most preferable.

The amount of the aqueous solvent per 100 parts by mass of a monomer composition is, for example, not smaller than 1.00 parts by mass, preferably not smaller than 200 parts by mass, more preferably not smaller than 400 parts by mass, and further preferably not smaller than 700 parts by mass, and is preferably not larger than 2000 parts by mass, more preferably not larger than 1500 parts by mass, and further preferably not larger than 1000 parts by mass.

The mode of adding the raw material monomer component into the reaction system is not particularly limited, and various modes can be adopted, such as a mode in which the whole amount is put into a reaction vessel at once before addition of a polymerization initiator; a mode in which, after a part of the monomer composition is polymerized, the rest is added into the reaction system at once or at several times; and a mode in which the monomer composition is continuously added into the reaction system at a constant rate. From the viewpoint of preventing the formation of a coarse polymer, a mode in which, after a part of the monomer composition is polymerized, the rest is added into the reaction system (at once or continuously) is preferable. In this case, after the polymerization of the part of the monomer composition is started, the rest is preferably added, with the polymerization temperature maintained, before the polymerization is completed.

When the raw material monomer component is polymerized, for example, means such as a polymerization initiator, irradiation with ultraviolet rays or radiation, and application of heat is used, and a polymerization initiator is preferably used. From the viewpoint of the dispersibility of the raw material monomer component, a polymerization initiator (redox type polymerization initiator) that is a combination of an oxidizing agent and a reducing agent is preferable.

As the oxidizing agent, one type or two or more types can be used, and examples of the oxidizing agent include hydrogen peroxide; hydroperoxides such as t-butyl hydroperoxide, cumene hydroperoxide, p-menthane hydroperoxide, diisopropyl benzene peroxide, 1,1,3,3-tetramethyl hydroperoxide, and 2,4,4-trimethylpentyl-2-hydroperoxide; ketone peroxides such as methyl ethyl ketone peroxide, cyclohexanone peroxide, and acetyl ketone peroxide; and persulfates such as potassium sulfate, ammonium persulfate, and sodium persulfate.

As the reducing agent, one type or two or more types can be used, and examples of the reducing agent include: ascorbic acid and ascorbates such as sodium ascorbate and potassium ascorbate; erythorbic acid and erythorbates such as sodium erythorbate and potassium erythorbate; tartaric acid and tartrates such as sodium tartrate and potassium tartrate; phosphorous acid and phosphites such as sodium phosphite and potassium phosphite; hydrogen phosphites such as sodium hydrogen phosphite and potassium hydrogen phosphite; sulfites such as sodium sulfite and potassium sulfite; hydrogen sulfites such as sodium hydrogen sulfite and potassium hydrogen sulfite; thiosulfates such as sodium thiosulfate and potassium thiosulfate; thiosulfites such as sodium thiosulfite and potassium thiosulfite; pyrosulfites such as sodium pyrosulfite and potassium pyrosulfite; hydrogen pyrosulfites such as sodium hydrogen pyrosulfite and potassium hydrogen pyrosulfite; pyrophosphates such as sodium pyrophosphate and potassium pyrophosphate; and sodium hydroxymethanesulfonate (sodium formaldehyde sulfoxylate). In addition, a sulfate or chloride of a heavy metal such as iron, nickel, chromium, molybdenum, or cerium can be used in combination as necessary.

The redox type polymerization initiator is preferably a polymerization initiator that is a combination of one or more oxidizing agents selected from hydroperoxides and one or more reducing agents selected from ascorbic acid and ascorbates, and is more preferably a polymerization initiator that is a combination of hydrogen peroxide (oxidizing agent) and ascorbic acid (reducing agent).

The total amount of the reducing agent and the oxidizing agent per 100 parts by mass of the total amount of the raw material monomer component is preferably not smaller than 0.1 parts by mass, more preferably not smaller than 0.5 parts by mass, and further preferably not smaller than 1 part by mass, and is preferably not larger than 5 parts by mass, more preferably not larger than 3 parts by mass, and further preferably not larger than 2 parts by mass.

Moreover, as for the polymerization initiator, the whole amount of the polymerization initiator may be added at the beginning (before the start of the reaction), or a part of the polymerization initiator may be added at the beginning, and the rest may be continuously fed and added, or intermittently added in a pulsed manner, or the polymerization initiator may be added by a method that is a combination thereof.

The reaction temperature when carrying out the polymerization reaction is, for example, preferably not lower than 30° C. and more preferably not lower than 60° C., and is preferably not higher than 100° C. and more preferably not higher than 95° C. If the reaction temperature is within this range, the polymerization reaction can be easily controlled. The reaction time is usually preferably 1.0 minutes to 1200 minutes and more preferably 30 minutes to 360 minutes.

3. Aqueous Dispersion

An aqueous dispersion containing the above-described water and the above-described resin particle dispersed in the water is also included in the scope of the present invention. In the aqueous dispersion of the present invention, the resin particle has an ester group and a hydroxymethyl group and has excellent hydrophilicity. In addition, the dispersibility in water is good, the storage stability as a dispersion is also good, and hydrolysis can be carried out more easily. In the case where hydrolysis is performed and neutralization is subsequently performed as necessary, the hydrolysis can be performed by, for example, adding a basic aqueous solution such as an aqueous sodium hydroxide solution, an aqueous ammonia solution, and an aqueous cyclohexylamine solution to the resin particle contained in the aqueous dispersion. Furthermore, partial neutralization or complete neutralization can be performed by appropriately adding an acid to the hydrolyzed solution. By performing the hydrolysis and the neutralization, the group corresponding to $R^1$ in formula (1) can be made into a hydrogen atom, an alkali metal atom, or an ammonium. The pH and the volume average particle diameter of the resin particle can be easily adjusted by adjusting the amount of the acid or base used during polymerization, hydrolysis, and neutralization, or by adjusting the proportion of a monomer unit in which $R^1$ is a hydrogen atom. Therefore, the resin particle can be used in a wide range of applications.

The pH of the resin particle that has not been subjected to the above hydrolysis is preferably not lower than 1.5 and lower than 7, more preferably not lower than 2 and not higher than 6, further preferably not lower than 2.5 and not higher than 5.5, and particularly preferably not lower than 2.7 and not higher than 5.0. Meanwhile, the pH of the resin particle that has been subjected to the above hydrolysis is preferably not lower than 5 and lower than 14, more preferably not lower than 6 and not higher than 13.9, further preferably not lower than 6.5 and not higher than 13.8, and particularly preferably not lower than 7.5 and not higher than 13.7.

The volume average particle diameter of the resin particle contained in the aqueous dispersion is preferably 0.10 nm to 10 μm, more preferably 50 nm to 5 μm, further preferably 100 nm to 1 μm, and particularly preferably 150 to 500 nm.

This application claims priority to Japanese Patent Application No. 2019-067834, filed on Mar. 29, 2019. The entire contents of the specifications of Japanese Patent Application No. 2019-067834, filed on Mar. 29, 2019 are hereby incorporated by reference.

EXAMPLES

Hereinafter, the present invention is described in more detail by Examples, but the present invention is by no means limited to the following Examples. The present invention can be suitably modified in the range adaptable to the spirit described above and below, and any of the modifications are included in the technical scope of the present invention.

<Measurement of Volume Average Particle Diameter of Crosslinked Fine Particle>

An obtained crosslinked fine particle dispersion was diluted with ion-exchanged water and measured with a light scattering particle size distribution measuring machine ("NicompMODEL380", manufactured by Particle Sizing Systems, Inc.) to obtain a volume average particle diameter (nm), and the value thereof was defined as the volume average particle diameter of the crosslinked fine particle.

<Moisture Absorption Evaluation>

10 parts by mass of the crosslinked fine particle dispersion was weighed on a glass petri dish having an inner diameter of 4 cm, and dried at 105° C. for 2 hours in a forced convection constant-temperature oven ("DNF400", manufactured by Yamato Scientific Co., Ltd.). The obtained dry granular material was ground in an agate pot to obtain dry powder. Subsequently, the dry powder was dried again at 105° C. for 60 minutes in the forced convection constant-temperature oven to obtain test powder.

A glass petri dish having an inner diameter of 4 cm with a lid was prepared, the mass of the petri dish was measured, and the measured mass was defined as X (g). Next, about 0.5 parts by mass of the obtained test powder was put into the glass petri dish having an inner diameter of 4 cm with the lid, then the petri dish was covered with the lid, the mass was accurately measured, and the measured mass was defined as Y (g). Subsequently, in a state where the lid of the petri dish containing the test powder was removed, the petri dish was placed in a thermo-hygrostat ("SH-241", manufactured by ESPEC CORP.) and stored under the conditions of a temperature of 25° C. and a relative humidity of 60% for 24 hours. Then, the petri dish was covered with the lid and taken out, the mass after moisture absorption was measured, and the measured mass was defined as Z (g). The moisture absorption ratio (water absorption ratio) was calculated by the following calculation equation.

$$\text{Moisture absorption ratio (\%)} = [(Z-Y)/(Y-X)] \times 100$$

<Production of Coating Film for Evaluation (Acrylic Plate)>

A crosslinked fine particle dispersion was blended such that the amount of the crosslinked fine particle was 0.25 parts by mass per 5.0 parts by mass of an acrylic resin emulsion ("UW EF-01.5", manufactured by NIPPON SHOKUBAI CO., LTD., polymer solid content: 50% by mass), and then sufficiently stirred with a stirrer chip to obtain a coating material for evaluation. The obtained coating material for evaluation was applied to a transparent acrylic plate (manufactured by Nippon Testpanel Co., Ltd., length: 70 mm, width: 150 mm, thickness: 2 mm) with an applicator such that the film thickness after the application was 50 μm, and dried at 100° C. for 10 minutes in a forced convection constant-temperature oven ("DNF400", manufactured by Yamato Scientific Co., Ltd.), whereby an acrylic plate (A) having a coating film laminated thereon was produced.

<Production of Coating Film for Evaluation (Polyethylene Terephthalate Film)>

A crosslinked fine particle dispersion was blended such that the amount of the crosslinked fine particle was 0.25 parts by mass per 5.0 parts by mass of an acrylic resin emulsion ("UW EF-01.5", manufactured by NIPPON SHOKUBAI CO., LTD., polymer solid content: 50% by mass), and then sufficiently stirred with a mixing device (mixer ARE-310, manufactured by THINKY CORPORATION) to obtain a coating material for evaluation. The obtained coating material for evaluation was applied to a transparent polyethylene terephthalate film (COSMOSHINE A4300, manufactured by Toyobo Co., Ltd., length: 297 mm, width: 210 mm, thickness: 0.100 mm) with a bar coater such that the film thickness after the application was 50 μm, and dried at 100° C. for 10 minutes in a forced convection constant-temperature oven ("DNF400", manufactured by Yamato Scientific Co., Ltd.), whereby a polyethylene terephthalate film (B) having a coating film laminated thereon was produced.

<Production of Coating Film for Evaluation (Aluminum Plate)>

An application surface of an aluminum test panel (A1050P, manufactured by Nippon Testpanel Co., Ltd., length: 150 mm, width: 70 mm, thickness: 0.800 mm) was wiped with Kimwipe soaked with acetone, until the Kimwipe did not get black stains any more. Next, Ultra Sealer III (manufactured by Nippon Paint Co., Ltd.) was applied to the aluminum test panel washed with acetone, with a bar coater such that the film thickness after the application was 11.5 μm, and dried at 100° C. for 10 minutes in a forced convection constant-temperature oven ("DNF400", manufactured by Yamato Scientific Co., Ltd.), whereby an aluminum test panel whose surface was modified was prepared. 5.0 parts by mass of Polyethylene Glycol 3400 (manufactured by FUJI-FILM Wako Pure Chemical Corporation, molecular weight: 3400) diluted with ion-exchanged water to 10.0% by mass of the active ingredient (hereinafter, referred to as "PEG (active ingredient: 10.0% by mass)") was added to 5.0 parts by mass of KURARAY POVAL 28-98 (manufactured by Kuraray Co., Ltd., saponification degree: 98% or higher, polymerization degree: 1700) diluted with ion-exchanged water to 10.0% by mass of the active ingredient (hereinafter, referred to as "PVA (active ingredient: 10.0% by mass)"), and the mixture was sufficiently stirred with a stirrer chip to obtain a hydrophilic binder (active ingredient: 10.0% by mass). Subsequently, a crosslinked fine particle dispersion was blended such that the amount of the crosslinked fine particle was 0.20 parts by mass per 10.0 parts by mass of the hydrophilic binder (active ingredient: 10.0% by mass), and then sufficiently stirred with a mixing device (mixer ARE-310, manufactured by THINKY CORPORATION) to obtain a coating material for evaluation. The obtained coating material for evaluation was applied to the aluminum test panel whose surface was modified, with a bar coater such that the film thickness after the application was 11.5 μm, and dried at 200° C. for 1 minute in a forced convection constant-temperature oven ("DNF400", manufactured by Yamato Scientific Co., Ltd.), whereby an aluminum plate (C) having a coating film laminated thereon was produced.

<Evaluation of Coating Film Hydrophilicity (Acrylic Plate)>

The obtained acrylic plate (A) having a coating film laminated thereon was allowed to stand overnight in an atmosphere having a temperature of 23° C. and a relative humidity of 65%. Then, using a static contact angle measuring device ("DM-500", manufactured by Kyowa Interface Science Co., Ltd.), 2 μL of pure water was dropped onto the coating film, and the contact angle was measured 30 seconds after the water droplet came into contact with the surface of the coating film. Although shown as a reference example in Table 1, the contact angle of an acrylic plate (A) having no coating film laminated thereon was 84.9°.

<Evaluation of Coating Film Hydrophilicity (Polyethylene Terephthalate Film, Aluminum Plate)>

The contact angle was measured by the same method as described in "Evaluation of coating film hydrophilicity (acrylic plate)", except that the acrylic plate (A) was replaced with the polyethylene terephthalate film (B) or the aluminum plate (C).

<Measurement of pH>

The value at 25° C. was measured with a pH meter ("F-72", manufactured by HORIBA, Ltd.).

Example 1

832.0 parts by mass of deionized water and 0.96 parts by mass of anionic reactive surfactant ADEKA REASOAP SR-20 (manufactured by ADEKA CORPORATION, active ingredient: 100% by mass), which contains an ether sulfate type ammonium salt as a main component, diluted with ion-exchanged water to 25.0% by mass of the active ingredient (hereinafter, referred to as "SR-20 (active ingredient: 25.0% by mass)") were added to a stainless steel reaction tank equipped with a stirrer, a thermometer, and a cooling device, and the internal temperature was raised to 75° C. and kept at the same temperature. Meanwhile, 180.0 parts by mass of methyl 2-(hydroxymethyl)acrylate (hereinafter, referred to as "RHMA") and 20.0 parts by mass of divinylbenzene (manufactured by NIPPON STEEL Chemical & Material Co., Ltd., divinylbenzene purity: 81%, hereinafter referred to as "DVB810") were mixed in a container different from the above reaction tank, to prepare 200.0 parts by mass of a monomer composition. Next, the inside of the above reaction tank was purged with nitrogen gas, then 40.0 parts by mass of the monomer composition, 21.0 parts by mass of a hydrogen peroxide solution (hydrogen peroxide concentration: 1.28% by mass), and 21.0 parts by mass of an L-ascorbic acid aqueous solution (L-ascorbic acid concentration: 1.90% by mass) were added into the reaction tank, and an initial polymerization reaction was carried out. Subsequently, the remaining 160.0 parts by mass of the monomer composition, 479.0 parts by mass of a hydrogen peroxide solution (hydrogen peroxide concentration: 0.22% by mass), and 486.04 parts by mass of a mixed composition of 479.0 parts by mass of an L-ascorbic acid aqueous solution (L-ascorbic acid concentration: 0.33% by mass) and 7.04 parts by mass of SR-20 (active ingredient: 25.0% by mass) were uniformly added dropwise to the reaction tank from different inlets over 4 hours. After completion of the dropping, the internal temperature was raised to 85° C., and the reaction solution was kept at the same temperature for 2 hours for aging. Then, the reaction solution was cooled to obtain a crosslinked fine particle dispersion (1a) having a crosslinked fine particle (1) dispersed therein. Various physical properties measured using the obtained crosslinked fine particle dispersion (1a) are shown in Table 1.

Example 2

10.0 parts by mass of the crosslinked fine particle dispersion (1a) and 4.6 parts by mass of an aqueous ammonia solution (ammonia concentration: 2.8% by mass) were added to a reaction tank and stirred at 25° C. for 30 minutes to obtain a crosslinked fine particle dispersion (2a) having a crosslinked fine particle (2) dispersed therein. The number of moles of the methoxycarbonyl group in RHMA added when the crosslinked fine particle dispersion (1a) was prepared was the same as the number of moles of ammonia added to the crosslinked fine particle dispersion (1a). Various physical properties measured using the obtained crosslinked fine particle dispersion (2a) are shown in Table 1.

Example 3

1472.6 parts by mass of deionized water and 0.16 parts by mass of SR-20 (active ingredient: 25.0% by mass) were added to a stainless steel reaction tank equipped with a stirrer, a thermometer, and a cooling device, and the internal temperature was raised to 75° C. and kept at the same temperature. Meanwhile, 198.0 parts by mass of RHMA and 2.0 parts by mass of DVB810 were mixed in a container different from the above reaction tank, to prepare 200.0 parts by mass of a monomer composition. Next, the inside of the above reaction tank was purged with nitrogen gas, then 100.0 parts by mass of the monomer composition, 20.0 parts by mass of a hydrogen peroxide solution (hydrogen peroxide concentration: 2.68% by mass), and 20.0 parts by mass of an L-ascorbic acid aqueous solution (L-ascorbic acid concentration: 4.00% by mass) were added into the reaction tank, and an initial polymerization reaction was carried out. Subsequently, the remaining 100.0 parts by mass of the monomer composition, 160.0 parts by mass of a hydrogen peroxide solution (hydrogen peroxide concentration: 0.50% by mass), and 168.2 parts by mass of a mixed composition of 160.0 parts by mass of an L-ascorbic acid aqueous solution (L-ascorbic acid concentration: 0.75% by mass), 7.84 parts by mass of SR-20 (active ingredient: 25.0% by mass), and 0.36 parts by mass of an aqueous ammonia solution (ammonia concentration: 28.0% by mass) were uniformly added dropwise to the reaction tank from different inlets over 4 hours. After completion of the dropping, the internal temperature was raised to 85° C., and the reaction solution was kept at the same temperature for 2 hours for aging. Then, the reaction solution was cooled to obtain a crosslinked fine particle dispersion (3a) having a crosslinked fine particle (3) dispersed therein. Various physical properties measured using the obtained crosslinked fine particle dispersion (3a) are shown in Table 1.

Example 4

10.0 parts by mass of the crosslinked fine particle dispersion (3a) and 5.1 parts by mass of an aqueous ammonia solution (ammonia concentration: 2.8% by mass) were added to a reaction tank and stirred at 25° C. for 30 minutes to obtain a crosslinked fine particle dispersion (4a) having a crosslinked fine particle (4) dispersed therein. The number of moles of the methoxycarbonyl group in RHMA added when the crosslinked fine particle dispersion (3a) was prepared was the same as the number of moles of ammonia added to the crosslinked fine particle dispersion (3a). Various physical properties measured using the obtained crosslinked fine particle dispersion (4a) are shown in Table 1. In addition, although the crosslinked fine particle (4) was in the form of particles, since the particle contained water and swelled, the scattering intensity was low and an accurate particle diameter was not able to be measured.

Comparative Example 1

832.0 parts by mass of deionized water and 0.92 parts by mass of a sodium dodecylbenzene sulfonate aqueous solution (active ingredient: 6.5% by mass, hereinafter referred to as "DBSNa (active ingredient: 6.5% by mass)") were added to a stainless steel reaction tank equipped with a stirrer, a thermometer, and a cooling device, and the internal temperature was raised to 75° C. and kept at the same temperature. Meanwhile, 180.0 parts by mass of methyl methacrylate (hereinafter, referred to as "MMA") and 20.0 parts by mass of DVB810 were mixed in a container different from the above reaction tank, to prepare 200.0 parts by mass of a monomer composition. Next, the inside of the above reaction tank was purged with nitrogen gas, then 40.0 parts by mass of the monomer composition, 21.0 parts by mass of a hydrogen peroxide solution (hydrogen peroxide concentration: 1.28% by mass), and 21.0 parts by mass of an L-ascorbic acid aqueous solution (L-ascorbic acid concentration: 1.90% by mass) were added into the reaction tank, and an initial polymerization reaction was carried out. Subsequently, the remaining 160.0 parts by mass of the monomer composition, 479.0 parts by mass of a hydrogen peroxide solution (hydrogen peroxide concentration: 0.22% by mass), and 485.77 parts by mass of a mixed composition of 479.0 parts by mass of an L-ascorbic acid aqueous solution (L-ascorbic acid concentration: 0.33% by mass) and 6.77 parts by mass of DBSNa (active ingredient: 6.5% by mass) were uniformly added dropwise to the reaction tank from different inlets over 4 hours. After completion of the dropping, the internal temperature was raised to 85° C., and the reaction solution was kept at the same temperature for 2 hours for aging. Then, the reaction solution was cooled to obtain a crosslinked fine particle dispersion (c1a) having a crosslinked fine particle (c1) dispersed therein. Various physical properties measured using the obtained crosslinked fine particle dispersion (c1a) are shown in Table 1.

Comparative Example 2

10.0 parts by mass of the crosslinked fine particle dispersion (c1a) and 0.5 parts by mass of an aqueous ammonia solution (ammonia concentration: 28% by mass) were added to a reaction tank and stirred at 25° C. for 30 minutes to obtain a crosslinked fine particle dispersion (c2a) having a crosslinked fine particle (c2) dispersed therein. The number of moles of the methoxycarbonyl group in MMA added when the crosslinked fine particle dispersion (c1a) was prepared was the same as the number of moles of ammonia added to the crosslinked fine particle dispersion (c1a). Various physical properties measured using the obtained crosslinked fine particle dispersion (c2a) are shown in Table 1.

TABLE 1

|  | Mass ratio of RHMA and DVB810 | Basic aqueous solution | Particle diameter (nm) | Moisture absorption ratio (%) | Contact angle of an acrylic plate (A) |
|---|---|---|---|---|---|
| Example 1 | RHMA/DVB810 = 90/10 | None | 188 | 6.8 | 79.7 |
| Example 2 | RHMA/DVB810 = 90/10 | $NH_3$ | 313 | 12.9 | 78.2 |
| Example 3 | RHMA/DVB810 = 99/1 | None | 465 | 5.8 | 79.9 |
| Example 4 | RHMA/DVB810 = 99/1 | $NH_3$ | — | 14.6 | 79.4 |
| Comparative Example 1 | MMA/DVB810 = 90/10 | None | 288 | 2.0 | 84.5 |
| Comparative Example 2 | MMA/DVB810 = 90/10 | $NH_3$ | 288 | 2.1 | 83.5 |
| Reference example | None | None | — | — | 84.9 |

Examples 5-1 to 5-3

Crosslinked fine particle dispersions (5-1a, 5-2a, 5-3a) were prepared in the same manner as Example 2, except that the addition amount of the aqueous ammonia solution (ammonia concentration: 2.8% by mass) was changed to the value shown in Table 2 (1.2 parts by mass (Example 5-1), 2.3 parts by mass (Example 5-2), 9.2 parts by mass (Example 5-3)). The pH and average particle diameter were measured using the obtained crosslinked fine particle dispersions (5-1a, 5-2a, 5-3a), and the measurement results are shown in Table 2. The crosslinked fine particle dispersion (1a) (Example 1) and the crosslinked fine particle dispersion (2a) (Example 2) were also measured for pH, and the pH and the volume average particle diameters thereof are shown in Table 2. In Table 2, "mol %" is indicated as the ratio of the addition amount of the aqueous ammonia solution in each example with the addition amount of the aqueous ammonia solution in Example 2 as a reference (100 mol %).

Examples 6-1 to 6-4

Crosslinked fine particle dispersions (6-1a, 6-2a, 6-3a, 6-4a) were prepared in the same manner as Example 2, except that 1.2 parts by mass (Examples 6-1), 2.3 parts by mass (Examples 6-2), 4.6 parts by mass (Examples 6-3), and 9.2 parts by mass (Examples 6-4) of an aqueous sodium hydroxide solution (sodium hydroxide concentration: 6.6% by mass) were added instead of the aqueous ammonia solution. The pH and average particle diameter were measured using the obtained crosslinked fine particle dispersions (6-1a, 6-2a, 6-3a, 6-4a), and the measurement results are shown in Table 2. In Example 6-3, the number of moles of the methoxycarbonyl group in RHMA added when the crosslinked fine particle dispersion (1a) was prepared was the same as the number of moles of sodium hydroxide added to the crosslinked fine particle dispersion (1a). In Table 2, "mol %" is indicated as the ratio of the addition amount of the aqueous sodium hydroxide solution in each example with an addition amount when 4.6 parts by mass of the aqueous sodium hydroxide solution was added, as a reference (100 mol %).

Examples 7-1 to 7-3

Crosslinked fine particle dispersions (7-1a, 7-2a, 7-3a) were prepared in the same manner as Example 4, except that the addition amount of the aqueous ammonia solution (ammonia concentration: 2.8% by mass) was changed to the value shown in Table 2 (1.3 parts by mass (Example 7-1), 2.5 parts by mass (Example 7-2), and 10.2 parts by mass (Example 7-3)). The pH and average particle diameter were measured using the obtained crosslinked fine particle dispersions (7-1a, 7-2a, 7-3a), and the measurement results are shown in Table 2. The pH was also measured in Example 3 and Example 4, and the pH is shown in Table 2. In Table 2, "mol %" is indicated as the ratio of the addition amount of the aqueous ammonia solution in each example with the addition amount of the aqueous ammonia solution in Example 4 as a reference (100 mol %). In addition, although the crosslinked fine particles (7-1a, 7-2a, 7-3a) were in the form of particles, since the particles contained water and swelled, the scattering intensity was low and an accurate particle diameter was not able to be measured.

Examples 8-1 to 8-4

Crosslinked fine particle dispersions (8-1a, 8-2a, 8-3a, 8-4a) were prepared in the same manner as Example 4, except that 1.3 parts by mass (Examples 8-1), 2.5 parts by mass (Examples 8-2), 5.1 parts by mass (Examples 8-3), and 10.2 parts by mass (Examples 8-4) of an aqueous sodium hydroxide solution (sodium hydroxide concentration: 6.6% by mass) were added instead of the aqueous ammonia solution. The pH was measured using the obtained crosslinked fine particle dispersions (8-1a, 8-2a, 8-3a, 8-4a), and the measurement results are shown in Table 2. In Example 8-3, the number of moles of the methoxycarbonyl group in RHMA added when the crosslinked fine particle dispersion (3a) was prepared was the same as the number of moles of sodium hydroxide added to the crosslinked fine particle dispersion (3a). In Table 2, "mol %" is indicated as the ratio of the addition amount of the aqueous sodium hydroxide solution in each example with an addition amount when 5.1 parts by mass of the aqueous sodium hydroxide solution was added, as a reference (100 mol %). In addition, although the crosslinked fine particles (8-1a, 8-2a, 8-3a, 8-4a) were in the form of particles, since the particles contained water and swelled, the scattering intensity was low and an accurate particle diameter was not able to be measured.

TABLE 2

| Mass ratio of RHMA and DVB810 | mol % (parts by mass) of Basic aqueous solution | Hydrolyze with NH₃ | | | Hydrolyze with NaOH | | |
|---|---|---|---|---|---|---|---|
| | | Example No. | particle diameter (nm) | pH | Example No. | particle diameter (nm) | pH |
| RHMA/DVB810 = 90/10 | 0 mol % (0 parts by mass) | Example 1 | 188 | 2.8 | Example 1 | 188 | 2.8 |
| | 25 mol % (1.2 parts by mass) | Example 5-1 | 241 | 10.1 | Example 6-1 | 255 | 9.5 |
| | 50 mol % (2.3 parts by mass) | Example 5-2 | 294 | 10.5 | Example 6-2 | 321 | 10.4 |
| | 100 mol % (4.6 parts by mass) | Example 2 | 313 | 10.8 | Example 6-3 | 342 | 13.2 |
| | 200 mol % (9.2 parts by mass) | Example 5-3 | 331 | 11.1 | Example 6-4 | 350 | 13.6 |
| RHMA/DVB810 = 99/1 | 0 mol % (0 parts by mass) | Example 3 | 465 | 3.4 | Example 3 | 465 | 3.4 |
| | 25 mol % (1.3 parts by mass) | Example 7-1 | — | 6.6 | Example 8-1 | — | 10.1 |
| | 50 mol % (2.5 parts by mass) | Example 7-2 | — | 7.8 | Example 8-2 | — | 11.4 |
| | 100 mol % (5.1 parts by mass) | Example 4 | — | 9.8 | Example 8-3 | — | 13.3 |
| | 200 mol % (10.2 parts by mass) | Example 7-3 | — | 10.0 | Example 8-4 | — | 13.7 |

Examples 9-1 and 9-2

Crosslinked fine particle dispersions (9-1a, 9-2a) were prepared in the same manner as Example 2, except that 0.38 parts by mass (Example 9-1) and 0.75 parts by mass (Example 9-2) of cyclohexanamine (cyclohexanamine concentration: 100% by mass) were added instead of the aqueous ammonia solution. In Example 9-2, the number of moles of the methoxycarbonyl group in RHMA added when the crosslinked fine particle dispersion (1a) was prepared was the same as the number of moles of cyclohexanamine added to the crosslinked fine particle dispersion (1a). In Table 3, "mol %" is indicated as the ratio of the addition amount of the aqueous cyclohexanamine solution in each example with an addition amount when 0.75 parts by mass of the aqueous cyclohexanamine solution was added, as a reference (100 mol %).

Examples 10 to 14

Crosslinked fine particle dispersions (10a to 14a) were prepared in the same manner as Example 2, except that the particle composition was changed to the particle composition shown in Table 3 and an aqueous sodium hydroxide solution was added instead of the aqueous ammonia solution. The contact angle was measured using the obtained crosslinked fine particle dispersions (10a to 14a), and the measurement results are shown in Table 3. In Table 3, "mol %" is indicated as the ratio of the addition amount of the aqueous sodium hydroxide solution in each example with an addition amount when 4.6 parts by mass of the aqueous sodium hydroxide solution was added, as a reference (100 mol %). In Table 3, "PEGDAE" means polyethylene glycol diallyl ether, and "4EGDMA" means tetraethylene glycol dimethacrylate. UNIOX (registered trademark) AA-480R manufactured by NOF CORPORATION was used as polyethylene glycol diallyl ether, and LIGHT ESTER 4EG manufactured by Kyoeisha Chemical Co., Ltd. was used as tetraethylene glycol dimethacrylate.

Example 15

1378.0 parts by mass of deionized water and 0.96 parts by mass of anionic reactive emulsifier ADEKA REASOAP SR-20 (manufactured by ADEKA CORPORATION, active ingredient: 100% by mass), which contains an ether sulfate type ammonium salt as main component, diluted with ion-exchanged water to 10% by mass of the active ingredient (hereinafter, referred to as "SR-20 (active ingredient: 25% by mass)") were added to a first stainless steel reaction tank equipped with a stirrer, a thermometer, and a cooling device, and the internal temperature was raised to 75° C. and kept at the same temperature. Meanwhile, 1.00 parts by mass of MMA was added to a second reaction tank different from the first reaction tank, to prepare 100 parts by mass of a monomer composition A. Furthermore, 90 parts by mass of RHMA and 10 parts by mass of DVB810 were mixed in a third reaction tank different from the first reaction tank and the second reaction tank, to prepare 100 parts by mass of a monomer composition B.

Next, the inside of the first reaction tank was purged with nitrogen gas, then 100 parts by mass of the monomer composition A, 20 parts by mass of a hydrogen peroxide solution (concentration: 3.35% by mass), and 20 parts by mass of an L-ascorbic acid aqueous solution (concentration: 5.0% by mass) were added into the first reaction tank, and an initial polymerization reaction was carried out. Subsequently, 100 parts by mass of the monomer composition B, 100 parts by mass of a hydrogen peroxide solution (concentration: 0.83% by mass), and 1.00 parts by mass of a mixed composition of 100 parts by mass of an L-ascorbic acid aqueous solution (concentration: 1.25% by mass), 7.04 parts by mass of SR-20 (active ingredient: 10% by mass), 0.36 parts by mass of an aqueous ammonia solution (concentration: 28% by mass), and 92.6% by mass of ion-exchanged water were uniformly added dropwise to the first reaction tank from different inlets over 3 hours. After completion of the dropping, the internal temperature of the first reaction tank was kept at 75° C., and the reaction solution was kept at the same temperature for 2 hours for aging. Then, the reaction solution was cooled to obtain a polymer aqueous dispersion (15) having a polymer (15) dispersed therein.

10 parts by mass of the obtained polymer aqueous dispersion (15) and 0.76 parts by mass of an aqueous sodium hydroxide solution (concentration: 10.0% by mass) as a basic aqueous solution were added to the first reaction tank and stirred at 25° C. overnight to obtain a polymer aqueous dispersion (15) having a partially hydrolyzed polymer dispersed therein.

Example 16, Example 17

Crosslinked fine particle dispersions (16 and 17) were prepared in the same manner as Example 15, except that the particle composition was changed to the particle composition shown in Table 3. In Table 3, "BA" means n-butyl acrylate.

Comparative Example 3

A crosslinked fine particle dispersion (c3a) was prepared in the same manner as Example 1, except that the particle composition was changed to the particle composition shown in Table 3. The contact angle was measured using the obtained crosslinked fine particle dispersion (c3a), and the measurement results are shown in Table 3.

Comparative Example 4

4266.5 g of methyl alcohol as an organic solvent and 333.0 g of 28 wt % aqueous ammonia (water and catalyst) were put into a glass reactor having a capacity of 10 L equipped with a stirrer, a dropping device, and a thermometer, and the liquid temperature was adjusted to 20±0.5° C. while stirring the mixture. Meanwhile, a solution prepared by dissolving 333.0 g of tetramethoxysilane as a silicon compound in 533.0 g of methyl alcohol was put into the dropping device. Then, the solution was dropped from the dropping device over 1 hour. After completion of the dropping, the mixture was further stirred for 1 hour to hydrolyze and condense tetramethoxysilane to obtain a suspension of a silica particle. The average particle diameter of the silica particle was 1.00 nm. The obtained suspension was dried using a flash vacuum evaporation device to take out the silica particle in the form of granular material. As the flash vacuum drying device, Clax System 8B type (manufactured by Hosokawa Micron Corporation) was used. In addition, as drying conditions, a heating pipe temperature of 175° C. and a pressure reduction degree of 200 torr were adopted. The flash vacuum evaporation device was provided with a stainless steel pipe which has an inner diameter of 8 mm and a length of 9 m and is covered with a jacket and to which heated steam is supplied, a supply unit for supplying the suspension to one end of the steel pipe, and a granular material collection chamber in a reduced pressure state, which is connected to the other end of the steel pipe and provided with a bag filter for separating the granular material and steam. Then, the suspension supplied from the supply unit was heated when passing through the steel pipe, and separated into the granular material and steam, the granular material was collected by the bag filter, and the steam was condensed and then discharged to the outside.

A crosslinked fine particle dispersion (c4a) was prepared in the same manner as in Example 1, except that the above silica particle in the form of granular material was used as the particle. The contact angle was measured using the obtained crosslinked fine particle dispersion (c4a), and the measurement results are shown in Table 3.

Comparative Example 5

1400 parts of deionized water and 6 parts of 65 wt % DBSNa were added to a stainless steel reaction tank equipped with a stirrer, a thermometer, and a cooling device, and the internal temperature was raised to 90° C. and kept at the same temperature.

Meanwhile, 100 parts of melamine, 193 parts of 37 wt % formalin, and 3 parts of 25 wt % aqueous ammonia were added to a reaction vessel different from the reaction tank and having the same equipment as described above, and the temperature was raised to 70° C. and kept at the same temperature for 40 minutes. Then, the mixture was added into the 65 wt % DBSNa aqueous solution kept at 90° C. Then, 50 parts of a 10 wt % DBS aqueous solution was added, and the mixture was further kept at 90° C. for 5 hours for aging to obtain a dispersion liquid containing an amino resin particle. 30 parts of a 10 wt % sulfate band aqueous solution was added to 1752 parts of the dispersion liquid containing the amino resin particle, and the mixture was stirred for 30 minutes. Then, the dispersion liquid was subjected to solid-liquid separation by a centrifuge, and the obtained cake was kept and dried in a hot air dryer kept at 190° C. under a nitrogen atmosphere for 5 hours. Then, pulverization with a jet mill pulverizer (pulverizing pressure: 0.7 MPa) and airflow classification were performed to obtain a melamine resin particle. The average particle diameter of the melamine particle was 200 nm.

A crosslinked fine particle dispersion (c5a) was prepared in the same manner as in Example 1, except that the above melamine particle was used as the particle. The contact angle was measured using the obtained crosslinked fine particle dispersion (c5a), and the measurement results are shown in Table 3.

Comparative Example 6

A crosslinked fine particle dispersion (c6a) was prepared in the same manner as in Example 1, except that a crosslinked poly acrylic acid (100CLPAH, manufactured by FUJIFILM Wako Pure Chemical Corporation) was used as the particle. However, in Comparative Example 6 using the above crosslinked polyacrylic acid, the viscosity was too high, so that blending was not able to be performed.

<Viscosity of Aqueous Dispersion>

The crosslinked fine particle dispersion (6-3a) was dried with a spray dryer (GA-32, manufactured by Yamato Scientific Co., Ltd.) to obtain crosslinked fine particle powder (6-3b). 9.0 parts by mass of ion-exchanged water was added to 1.0 parts by mass of the crosslinked fine particle powder (6-3b), and the mixture was sufficiently stirred with a stirrer chip to prepare a 10% by mass aqueous dispersion. Subsequently, using a cone plate type viscometer (DV-II+Pro, Brookfield, Rotor No. CPE-42, rotation speed: 30 rpm), 1 part by mass of the aqueous dispersion was placed in a sample dish, and the viscosity of the particle aqueous dispersion at 25° C. was measured. The viscosity was 5.62 mPa s.

Similarly, for the crosslinked polyacrylic acid particle used in Comparative Example 6, the viscosity of a 0.1% by mass aqueous dispersion was measured. The viscosity was 10.4 mPa·s, and was very high even though merely 0.1% by mass of the crosslinked polyacrylic acid particle was contained.

From this, it can be said that the resin particle of the present invention has extremely high blendability when used as various additives.

TABLE 3

| | | Basic aqueous solution | | Contact Angle (°) | |
| | | | Addition | | |
| No. | Particle composition | Kind | amount (mol %) | PET film (B) | Aluminum (C) |
|---|---|---|---|---|---|
| Reference example | None | None | | 82.7 | 27.7 |
| Example 6-2 | RHMA/DVB810 = 90/10 | NaOH | 50 | 71.7 | 5.6 |
| Example 6-3 | | NaOH | 100 | 68.0 | — |
| Example 9-1 | | $C_6H_{11}NH_2$ | 50 | 66.5 | 10.7 |
| Example 9-2 | | $C_6H_{11}NH_2$ | 100 | 65.6 | — |
| Example 10 | RHMA/PEGDAE = 90/10 | NaOH | 30 | 64.6 | 6.8 |
| Example 11 | RHMA/4EGDMA = 90/10 | NaOH | 50 | 55.9 | 9.1 |
| Example 12 | RHMA/MMA/DVB810 = 50/40/10 | NaOH | 30 | 73.0 | 7.8 |
| Example 13 | RHMA/MMA/DVB810 = 30/60/10 | NaOH | 5 | 77.7 | 24.3 |
| Example 14 | RHMA/MMA/DVB810 = 20/70/10 | NaOH | 4 | 78.0 | 28.7 |
| Example 15 | core:MMA = 100 shell:RHMA/DVB810 = 90/10 | NaOH | 50 | 73.7 | <5 |
| Example 16 | core:MMA/BA = 50/50 shell:RHMA/DVB810 = 90/10 | NaOH | 50 | 73.7 | <5 |
| Example 17 | core:BA = 100 shell:RHMA/DVB810 = 90/10 | NaOH | 50 | 74.0 | 8.2 |
| Comparative Example 3 | MMA/DVB810 = 70/30 | None | | 84.8 | 78.9 |
| Comparative Example 4 | silica particle: average particle diameter of 100 nm | None | | 86.1 | 41.9 |
| Comparative Example 5 | melamine particle: average particle diameter of 200 nm | None | | 84.7 | 49.8 |
| Comparative Example 6 | crosslinked polyacrylic acid particle | None | | no blending | no blending |

INDUSTRIAL APPLICABILITY

The resin particle of the present invention can be used as a hydrophilicity imparting agent, a moisture absorbent, a column filler, and an antistatic agent, and can also be used as a stain-resistant coating material, a water-absorbent resin, a matting agent, a medical diagnostic agent, a coating agent, a water-retaining agent, a moisture-absorbing and releasing agent, a refractive index modifier, an anti-blocking agent, an anti-fog agent, etc.

The invention claimed is:

1. A resin particle comprising a crosslinked structure in which at least one of monomers represented by the following general formula (1) and a polyfunctional ethylenically unsaturated monomer are crosslinked,

[Chem. 1]

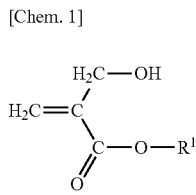

(1)

wherein $R^1$ represents an alkyl group having 1 to 4 carbon atoms, a hydrogen atom, an alkali metal atom, or an ammonium,
wherein the content of a monomer unit derived from the polyfunctional ethylenically unsaturated monomer is not lower than 0.5% by mass based on the resin particle, and
wherein the content of a monomer unit derived from a monomer other than the general formula (1) and the polyfunctional ethylenically unsaturated monomer is not higher than 75% by mass based on the resin particle.

2. The resin particle according to claim 1, wherein the polyfunctional ethylenically unsaturated monomer is a non-hydrolyzable monomer.

3. The resin particle according to claim 1, wherein the polyfunctional ethylenically unsaturated monomer is a hydrocarbon-based crosslinking agent optionally having an ether bond, and has two or more ethylenically unsaturated bonds.

4. The resin particle according to claim 1, wherein the polyfunctional ethylenically unsaturated monomer is at least one of divinylbenzene and 1,3-butadiene.

5. The resin particle according to claim 1, wherein a monomer unit derived from the general formula (1) is 30 to 99.99% by mass in total.

6. The resin particle according to claim 1, wherein the resin particle has a moisture absorption ratio of not lower than 2.5% by mass.

7. An aqueous dispersion containing water and the resin particle according to claim 1 dispersed in the water.

8. The aqueous dispersion according to claim 7, wherein the resin particle has a volume average particle diameter of 10 nm to 10 μm.

9. A hydrophilicity imparting agent containing the resin particle according to claim 1.

10. A method for producing a resin particle, comprising emulsion polymerization in which at least one of monomers represented by formula (2) and a polyfunctional ethylenically unsaturated monomer are dispersed in an aqueous solvent in the presence of an emulsifier and a polymerization reaction is carried out, thereby producing a crosslinked structure in which at least one of monomers represented by the following general formula (1) and the polyfunctional ethylenically unsaturated monomer are crosslinked,

[Chem. 2]

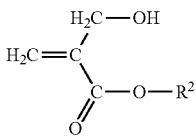

(2)

wherein $R^2$ represents an alkyl group having 1 to 4 carbon atoms,

[Chem. 1]

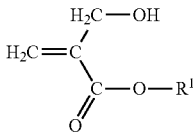

(1)

wherein $R^1$ represents an alkyl group having 1 to 4 carbon atoms, a hydrogen atom, an alkali metal atom, or an ammonium,
wherein the content of a monomer unit derived from the polyfunctional ethylenically unsaturated monomer is not lower than 0.5% by mass based on the resin particle, and
wherein the content of a monomer unit derived from a monomer other than the general formula (1) and the polyfunctional ethylenically unsaturated monomer is not higher than 75% by mass based on the resin particle.

11. The resin particle according to claim 1, wherein the resin particle has a volume average particle diameter of 100 nm to 10 μm.

12. The resin particle according to claim 1, wherein the content of a monomer unit derived from the general formula (1) is not lower than 20% by mass.

13. The aqueous dispersion according to claim 7, wherein the resin particle has a volume average particle diameter of 100 nm to 10 μm.

* * * * *